(12) United States Patent
Pope et al.

(10) Patent No.: US 9,648,687 B2
(45) Date of Patent: May 9, 2017

(54) LIGHTING APPARATUS USING SERIES-CONNECTED CURRENT SOURCES AND METHODS OF OPERATING SAME

(71) Applicant: Cree, Inc., Durham, NC (US)

(72) Inventors: Daniel Pope, Morrisville, NC (US); Mike Walters, Apex, NC (US)

(73) Assignee: Cree, Inc., Durham, NC (US)

( * ) Notice: Subject to any disclaimer, the term of this patent is extended or adjusted under 35 U.S.C. 154(b) by 282 days.

(21) Appl. No.: 14/465,580

(22) Filed: Aug. 21, 2014

(65) Prior Publication Data
US 2016/0057828 A1    Feb. 25, 2016

(51) Int. Cl.
*H05B 33/08* (2006.01)

(52) U.S. Cl.
CPC ..... *H05B 33/0845* (2013.01); *H05B 33/0815* (2013.01); *Y02B 20/347* (2013.01)

(58) Field of Classification Search
CPC .... H05B 37/02; H05B 33/08; H05B 33/0815; H05B 33/0827; H05B 33/0842; H05B 33/0845; Y02B 20/347
USPC .............. 315/185 R, 291, 307, 308, 312
See application file for complete search history.

(56) References Cited

U.S. PATENT DOCUMENTS

| | | | |
|---|---|---|---|
| 7,781,979 B2* | 8/2010 | Lys | H05B 33/0857 315/185 S |
| 2011/0068702 A1* | 3/2011 | van de Ven | H05B 33/0854 315/186 |

* cited by examiner

*Primary Examiner* — Jimmy Vu
(74) *Attorney, Agent, or Firm* — Coats & Bennett, PLLC

(57) ABSTRACT

An apparatus includes a plurality of series-connected current control circuits configured to control a current therethrough responsive to at least one current reference signal and to be coupled in parallel with a load, such as a string of LEDs. The apparatus further includes a voltage control circuit configured to control respective voltages across respective ones of the current control circuits. In some embodiments, the voltage control circuit may be configured to individually adjust responses of the current control circuits responsive to the voltages across the current control circuits. In further embodiments, the voltage control circuit may include respective voltage limiters coupled across respective ones of the current control circuits.

23 Claims, 11 Drawing Sheets

LIGHTING APPARATUS USING SERIES-CONNECTED CURRENT SOURCES AND METHODS OF OPERATING SAME

BACKGROUND

The present inventive subject matter relates to lighting apparatus and methods and, more particularly, to solid-state lighting apparatus.

Solid-state lighting arrays are used for a number of lighting applications. A solid-state light-emitting device may include, for example, a packaged light emitting device including one or more light emitting diodes (LEDs). These may include inorganic LEDs, which may include semiconductor layers forming p-n junctions, and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent lamps have also been developed.

An LED driver may use a series-connected current source to control current through a string of LEDs. The current level may be varied by the current source to vary intensity of the light output of the LEDs.

SUMMARY

Some embodiments of the inventive subject matter provide an apparatus including a plurality of series-connected current control circuits configured to control a current therethrough responsive to at least one current reference signal and to be coupled in parallel with a load, such as a string of LEDs. The apparatus further includes a voltage control circuit configured to control respective voltages across respective ones of the current control circuits.

In some embodiments, the voltage control circuit may be configured to individually adjust responses of the current control circuits responsive to the voltages. For example, the current control circuits may include respective current control loops and the voltage control circuit may include a current reference adjustment circuit configured to generate adjusted current reference signals for the current control loops from the at least one current reference signal responsive to the voltages. The current reference adjustment circuit may be configured to nonlinearly map the voltages to the adjusted current reference signals, In further embodiments, the voltage control circuit may include respective voltage limiters coupled across respective ones of the current control circuits. The voltage limiters may include, for example, respective diodes coupled across respective ones of the current control circuits.

Some embodiments of the inventive subject matter provide a lighting apparatus including a plurality of current source circuits coupled in series and configured to receive at least one current reference signal and respective individual current reference adjustment signals. Each of the current source circuits is further configured to control current passing therethrough responsive to the at least one current reference signal and the current reference adjustment signal associated therewith. The apparatus further includes a current reference adjustment circuit configured to generate the current reference adjustment signals responsive to voltages across respective ones of the current source circuits. At least one light emitting device is coupled in parallel with the plurality of current source circuits.

The current source circuits may include respective current control loops and the current source circuits may be configured to generate adjusted reference signals for the current control loops responsive to the at least one current reference signal and the current reference adjustment signals.

Methods according to some embodiments of the inventive subject matter include coupling a plurality of series-connected current sources in parallel with at least one light emitting device and limiting respective voltages across the current sources. In some embodiments, limiting the respective voltages may include adjusting current references of the current sources responsive to the voltages. In further embodiments, limiting the respective voltages includes limiting the voltages using respective clamping circuits coupled across respective ones of the current sources.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

Some embodiments of the inventive subject matter arise from a realization that current sources may be used in a series-connected arrangement to control currents through an LED string. Current sources may be connected in series in modular fashion for use with LED strings of various voltage levels, thus overcoming limitations arising from the voltage ratings of the individual current sources. Voltage deviation among the current source due to component tolerances, temperature and other effects is limited by voltage control circuits coupled across the current sources. The current sources may be coupled to one or more power sources, such as AC/DC converters, in various ways.

Figure 1:
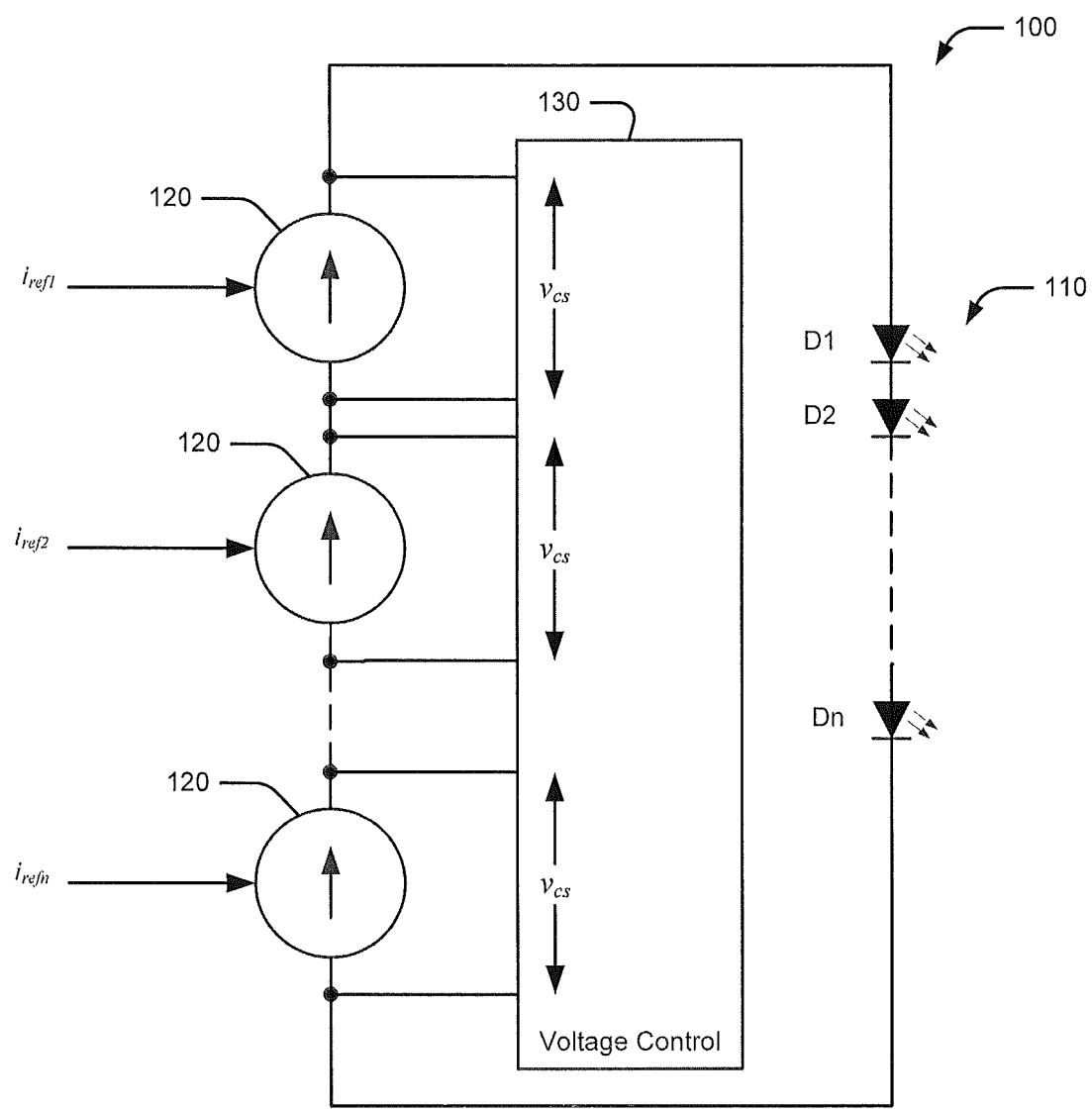
FIG. 1 is a schematic diagram illustrating lighting apparatus including series-connected current source circuits according to some embodiments.

FIG. 1 illustrates a lighting apparatus 100 according to some embodiments. The apparatus 100 includes at least one light-emitting device, here shown as a string 110 of LED's D1, D2, . . . , D3. It will be appreciated, however, that other types of light emitting devices and/or other arrangements of LEDs may be used in various embodiments. A plurality of current control circuits, here illustrated as current sources 120, are coupled in series. The serially connected current sources 120 are connected in parallel with the LED string 110. Each of the current sources 120 is configured to regulate a current therethrough responsive to a current reference signal $i_{ref1}, i_{ref2}, \ldots, i_{refn}$. A voltage control circuit 130 is coupled to the current sources 120 and configured to control voltages $v_{cs}$ developed across the current sources 120. As explained in detail below, the voltage control circuit 130 may operate in any of a number of different ways, such as by clamping the voltages across the current sources 120 and/or altering responses of the current sources 120 to the current reference signals $i_{ref1}, i_{ref2}, \ldots, i_{refn}$ and/or to current feedback signals of the current sources 120.

Figure 2:
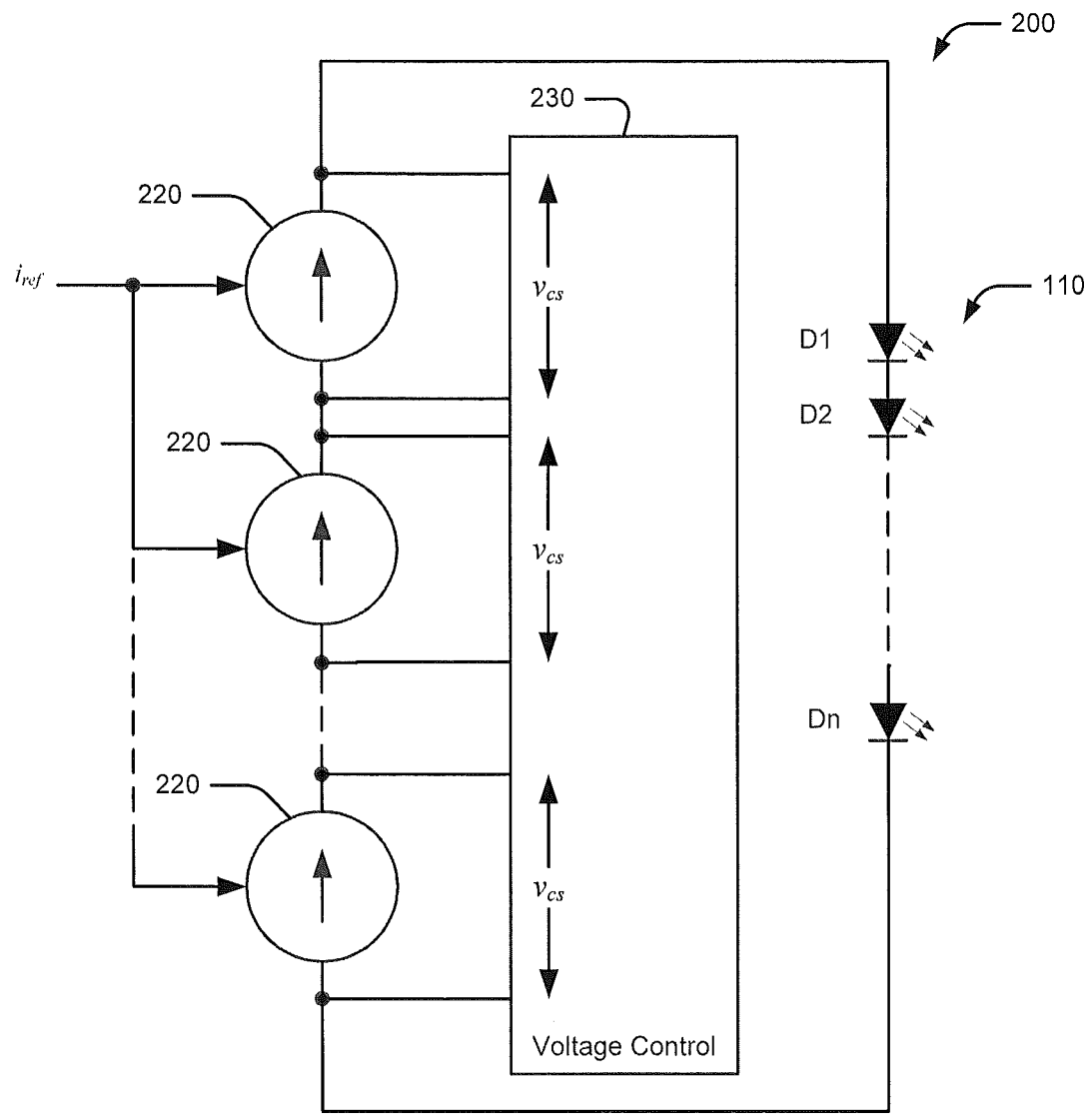
FIG. 2 is a schematic diagram illustrating lighting apparatus including series-connected current source circuits according to some embodiments.

As shown in FIG. 1, in some embodiments, individual current sources 120 may receive respective current reference signals $i_{ref1}, i_{ref2}, \ldots, i_{refn}$. The individual current reference signals $i_{ref1}, i_{ref2}, \ldots, i_{refn}$ may be substantially the same, such that the current sources 120 maintain substantially the same current levels therethrough. However, it will be appreciated that it not necessarily required for the current reference signals to be the substantially the same. In particular, in some embodiments, the voltage control circuits 130 may compensate for current reference signal mismatches. As shown in FIG. 2, in further embodiments, a common current reference signal $i_{ref}$ may be provided to series-connected currents sources 120.

The current source configurations shown in FIGS. 1 and 2 may offer several advantages. In particular, by coupling the current sources in series, relatively long LED strings having relatively high forward voltages may be driven without exceeding voltage ratings of components of the individual current sources. Thus, for example, current sources may be used in a modular fashion, with the number of serially connected current sources used tailored to the characteristic of the LED string being driven.

It will be understood that the current sources 120 and the voltage control circuit 130 may be implemented using any of a number of different circuit configurations. Generally, the current sources 120 and/or the voltage control circuit 130 may be implemented using analog circuitry or combinations of analog and digital circuitry. It will be appreciated that a voltage control circuit, such as the voltage control circuit 130 of FIG. 1, may be implemented as multiple circuits, respective ones of which control respective current sources, such as the current sources 120, and/or may be implemented using integrated circuitry that controls multiple current sources, such as a microprocessor or microcontroller.

Current sources, such as the current sources 120, and a voltage control circuit, such as the voltage control circuit 130, may be arranged in any of a number of different physical configurations. For example, in some embodiments, current sources, such as the current sources 120, and/or a voltage control circuit, such as the voltage control circuit 130, may be integrated with light emitting devices in a lighting fixture, lamp, or similar lighting device. Such fixtures, lamps and other lighting devices may also include additional circuitry, such as power supply circuitry described below with reference to FIGS. 9-13. In further embodiments, current sources, such as the current sources 120, and/or a voltage control circuit, such as the voltage control circuit 130, may be packaged separately from the light emitting device(s) coupled thereto in a driver module or other apparatus, which may be configured to be connected to an LED string or other light emitting device using wires or cables. Such a module or other driver apparatus may also include additional circuitry, such as power supply circuitry described below with reference to FIGS. 9-13.

Figure 3:
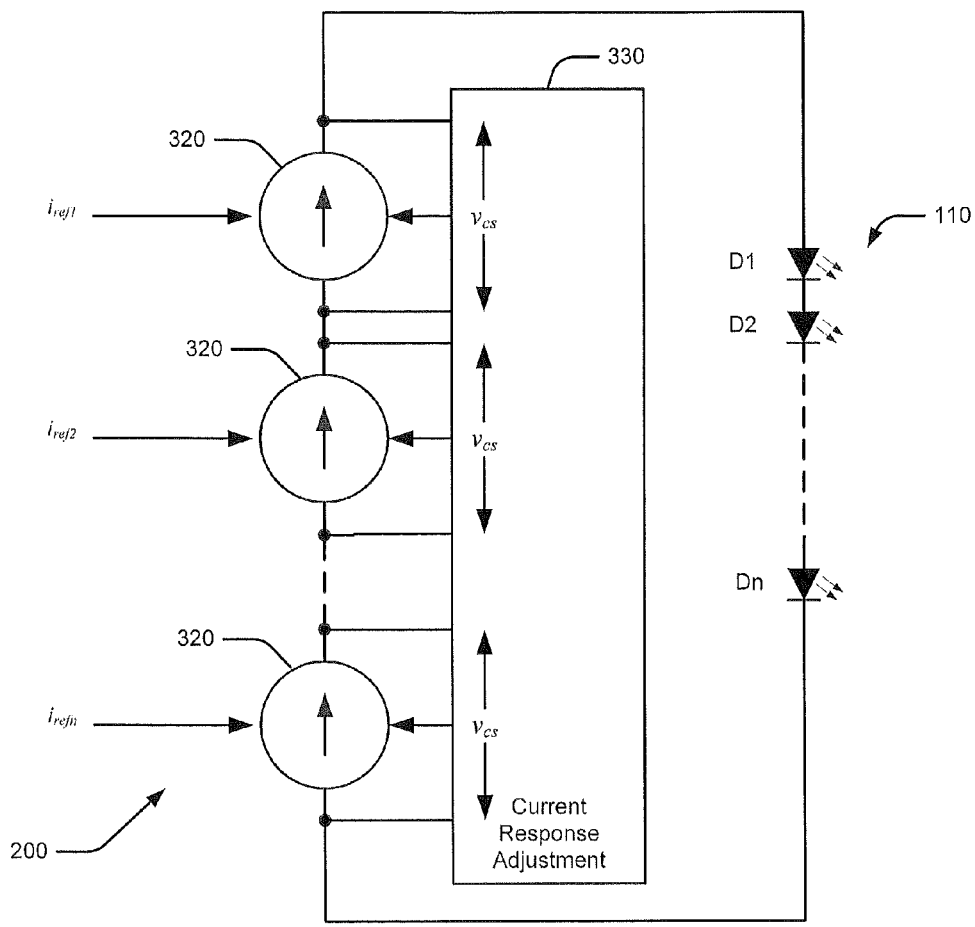
FIG. 3 is a schematic diagram illustrating lighting apparatus including series-connected current source circuits with current reference adjustment according to some embodiments.

FIG. 3 illustrates lighting apparatus 300 using an arrangement for controlling voltages $v_{cs}$ developed across series-connected current sources 320 according to some embodiments. A current response adjustment circuit 330 is configured to adjust responses of the current sources 320 to a common current reference signal $i_{ref}$ responsive to voltages $v_{cs}$ across the current sources 320.

Figure 4:
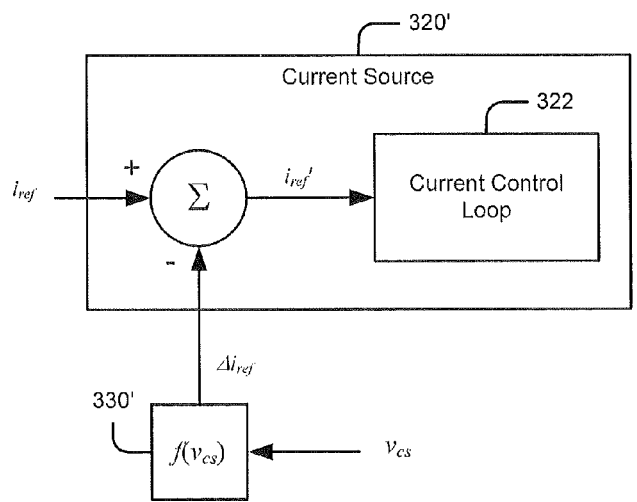
FIG. 4 is a schematic diagram illustrating a current source with current reference adjustment responsive to voltage across the current source according to further embodiments.

In some embodiments, the current response adjustment circuit 330 may generate adjustment signals that are used to generate modified control signals for current loops of the current sources 320 based on the voltages $v_{cs}$. For example, as shown in FIG. 4, a current response adjustment circuit 330' may apply a mapping $f(v_{cs})$ to the voltage $v_{cs}$ to generate a current reference adjustment signal $\Delta i_{ref}$. The current reference adjustment signal $\Delta i_{ref}$ may be provided to a current source circuit 320', which may generate an adjusted current reference signal $i_{ref}'$ from the current reference signal $i_{ref}$ and the current reference adjustment signal $\Delta i_{ref}$. The adjusted current reference signal $i_{ref}'$ may be provided as a current reference input for a current control loop 322 that controls current through the current source 320'.

Figure 5:
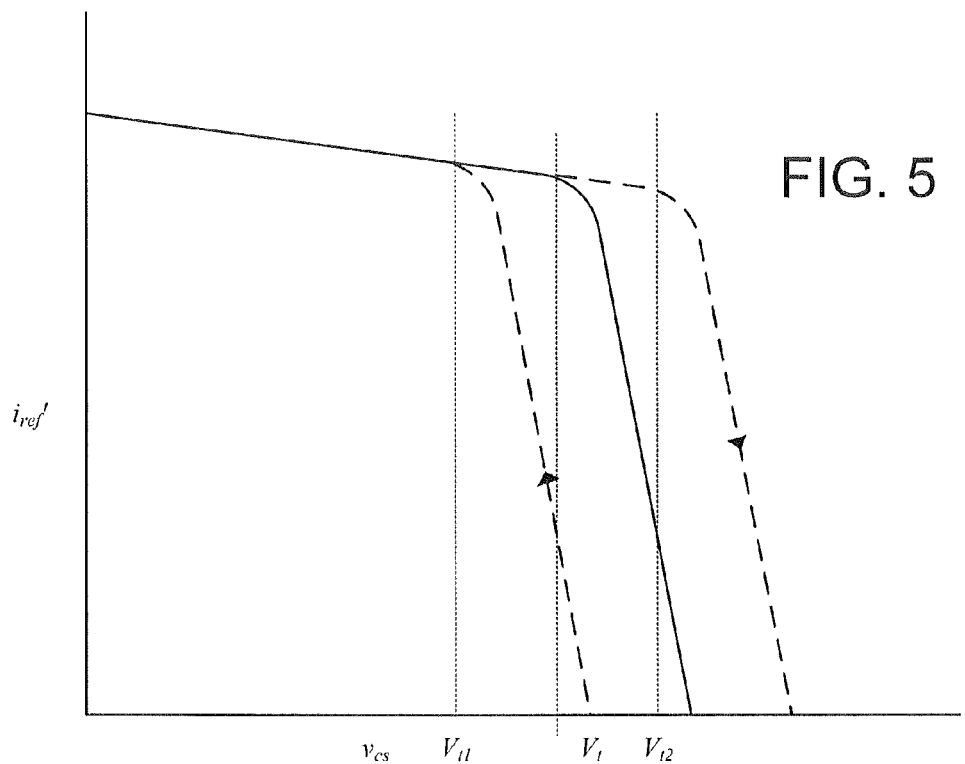
FIGS. 5 and 6 illustrate examples of voltage to current characteristics that may be provided by the apparatus of FIGS. 3 and 4.
Figure 6:
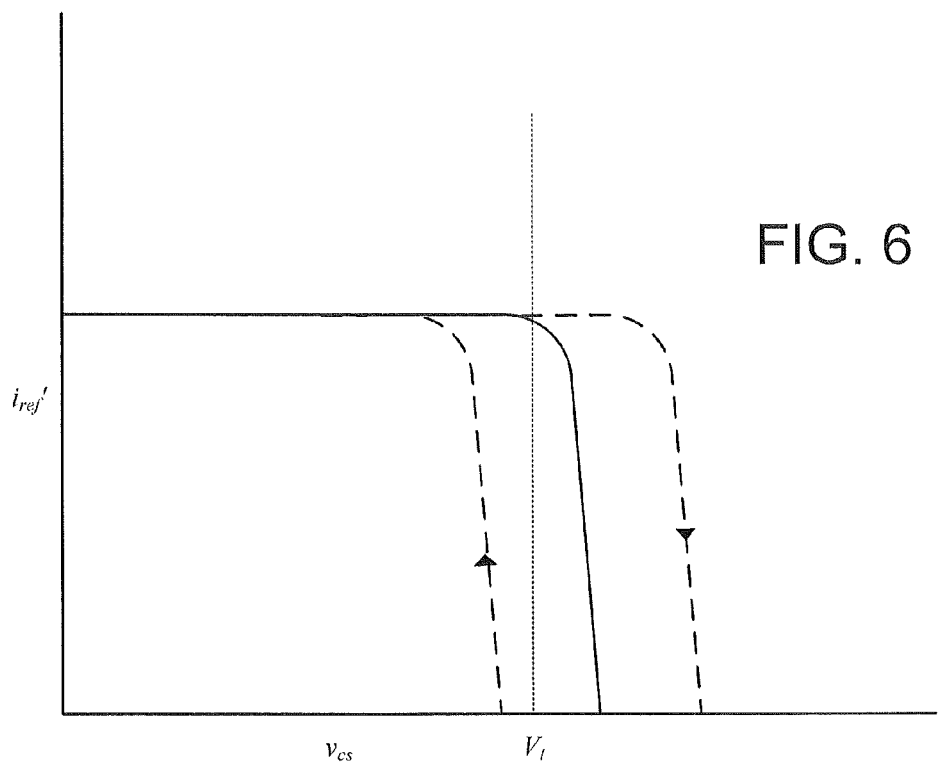

FIGS. 5 and 6 illustrate examples of relationships of the current source voltage $v_{cs}$ to such an adjusted current reference signal $i_{ref}'$ that may be provided by a current response adjustment circuit 330' as shown in FIG. 4. In particular, as shown in FIG. 5, the adjusted current reference $i_{ref}'$ may exhibit a droop characteristic, decreasing along a first slope until the current source voltage $v_{cs}$ exceeds a threshold Vt, above which the adjusted current reference $i_{ref}'$ rapidly decreases towards a minimum. As further shown in FIG. 5, the current response adjustment circuit 330' may provide hysteresis, e.g., the adjusted current reference signal $i_{ref}'$ may decrease along a first slope until a first threshold voltage $V_{t1}$, above which the adjusted current reference signal $i_{ref}'$ rapidly decreases toward a minimum. The adjusted current reference signal $i_{ref}'$ may not increase until the current source voltage $v_{cs}$ decreases below a second threshold voltage $V_{t2}$ less than the first threshold voltage $V_{t1}$. FIG. 6 illustrates another example, in which the variable current reference $i_{ref}'$ is substantially constant to a threshold $V_t$, and then rapidly declines. Hysteresis may also be provided as shown.

It will be appreciated that a current response adjustment circuit, such as the current reference adjustment circuit 330 of FIG. 3, may be implemented as multiple adjustment circuits, respective ones of which control respective current sources, such as the current sources 320, and/or may be implemented using integrated circuitry that controls multiple current sources, such as a microprocessor or microcontroller. Generally, current response adjustment circuit may be implemented using analog circuitry, digital circuitry or combinations of analog and digital circuitry.

It will be further understood that current response may be adjusted in other ways than those described above. For example, in some embodiments, current feedback signals may be adjusted instead of or in addition to adjusting current references.

Figure 7:
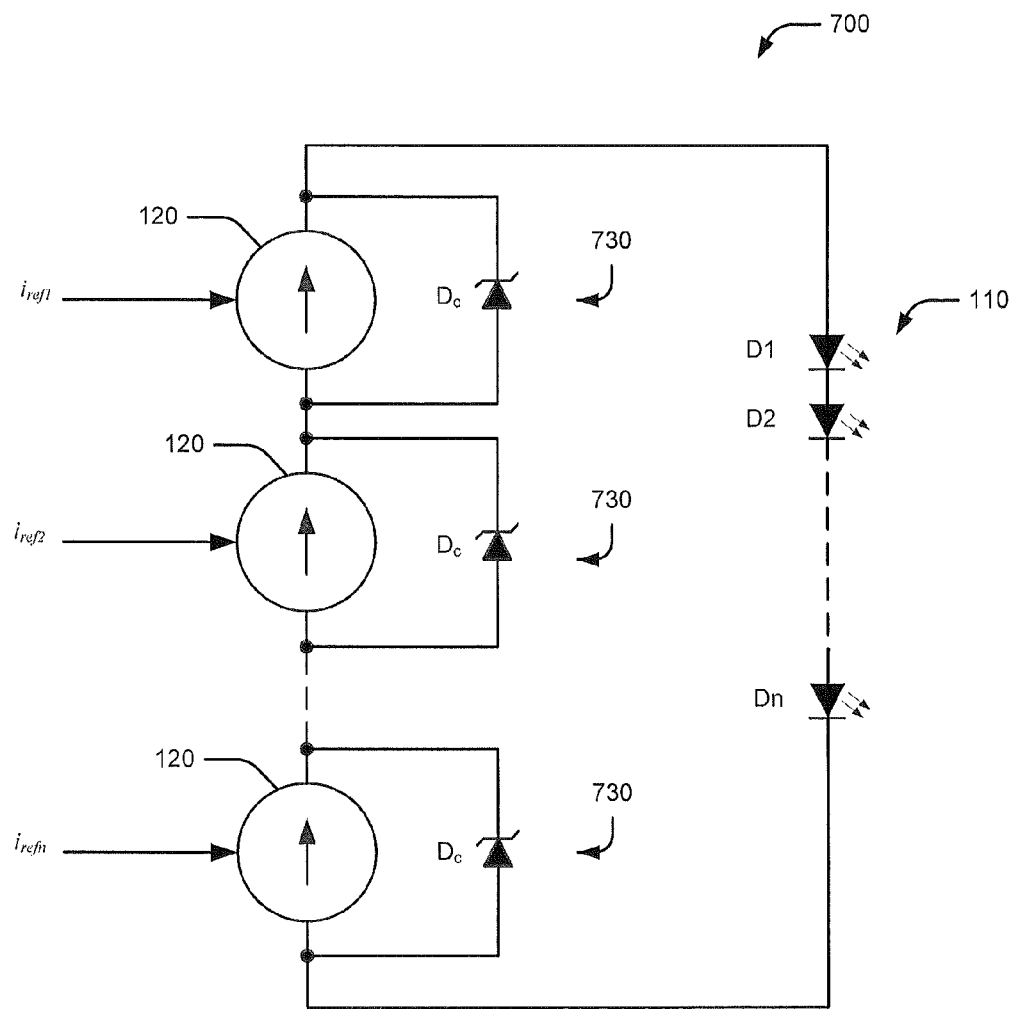
FIG. 7 is a schematic diagram illustrating lighting apparatus with series-connected current sources with voltage limiters according to some embodiments.

According to further embodiments, serially connected current sources may be controlled in different ways, such as by using clamping circuits that limit voltages across respective current sources. Referring to FIG. 7, lighting apparatus 700 according to further embodiments includes a plurality of series-connected current sources 120 coupled in parallel with an LED string 110. Voltages across the current sources 120 are controlled by respective clamping diodes $D_e$, which selectively conduct to limit voltages developed across the current sources 120. In some embodiments, the clamping diodes $D_c$ may be bidirectional diodes, e.g., zener diodes, which may conduct for voltages of positive and negative polarities. In some embodiments, however, the clamping diodes Dc may be regular (unidirectional) diodes that will conduct only for voltages of a given polarity.

Figure 8:
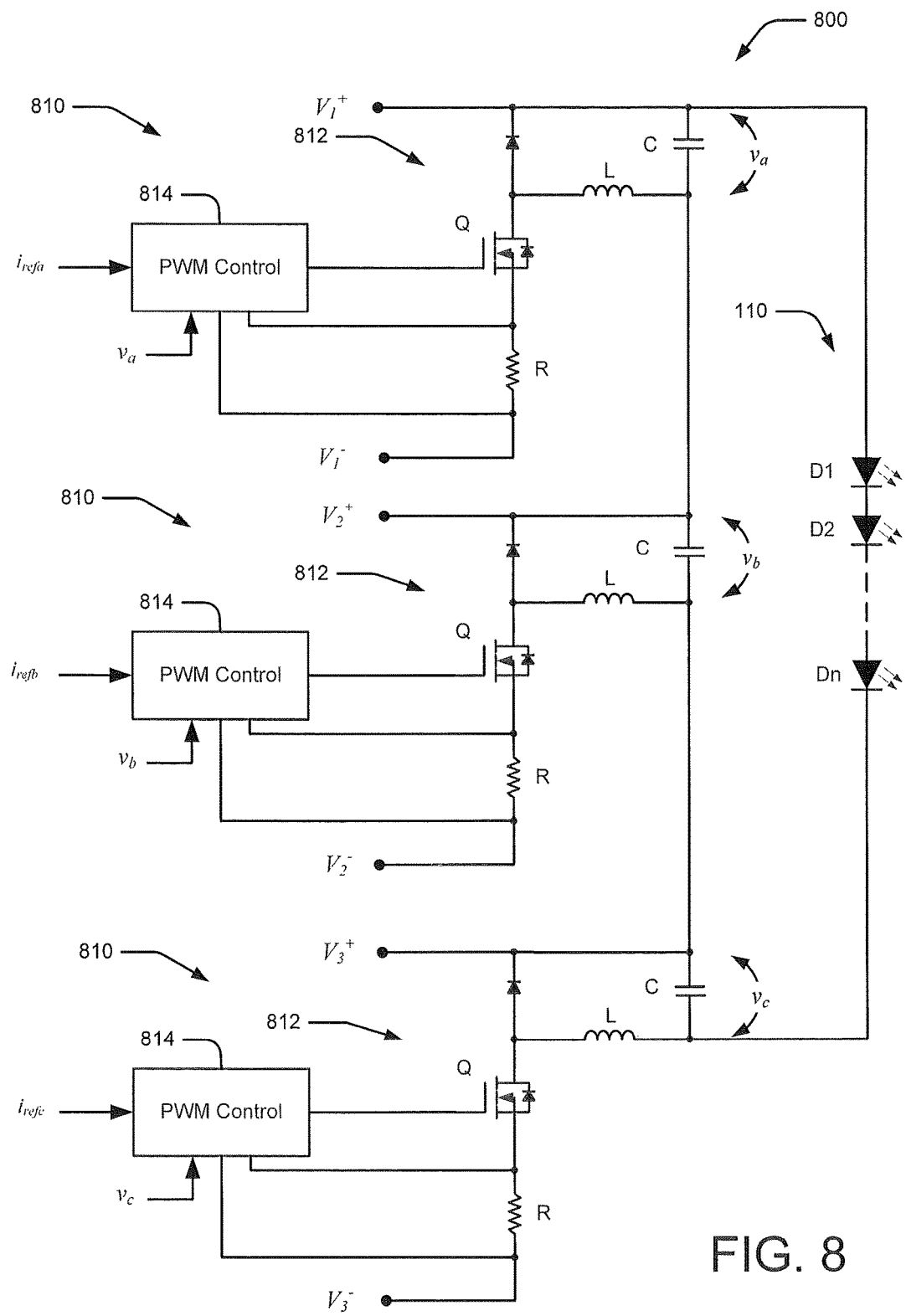
FIG. 8 is a schematic diagram illustrating lighting apparatus with series-connected current sources according to further embodiments.

FIG. 8 illustrates a lighting apparatus 800 including series-connected current sources 810 coupled in parallel with a string 110 of LEDs D1, D2, . . . , Dn. The current sources 810 include buck current regulators 812 biased between respective power supply nodes $V_1^+/V_1^-$, $V_2^+/V_2^-$, $V_3^+/V_3^-$ and controlled by pulse width modulation (PWM) control circuits 814. Each of the buck current regulators 812 includes a switching transistor Q, an inductor L, a capacitor C, and a freewheeling diode D. The PWM control circuits 814 control the switching transistors Q responsive to a current reference signal and voltages developed across current sense resistors R. The PWM control circuits 814 may comprise, for example, analog or digital control circuitry (e.g., microprocessor-based current loop controllers or analog circuits performing similar current loop control). The PWM control circuits 814 may be implemented as separate individual controllers. For example, such a buck current regulator 812 and a PWM control circuit 814 may be integrated in a module or similar assembly configured to be to be coupled to other similar modules to provide a scalable system for driving strings of LEDs. In some embodiments, the PWM control circuits 814 may be implemented using a single integrated controller (e.g., a single microcontroller with multiple PWM functional units) that controls multiple ones of the buck current regulators 812. As further shown, control of voltages $v_a$, $v_b$, $v_c$ across the respective current sources 810 along the lines described above may also be implemented by the PWM control circuits 814. For example, the voltages $v_a$, $v_b$, $v_c$ may be controlled using techniques that adjust current references used by the PWM circuits 814 responsive to the voltages $v_a$, $v_b$, $v_c$, along the lines described above with reference to FIGS. 3-6.

As shown in FIG. 8, in some embodiments, respective current reference signals $i_{refa}$, irefb, $i_{refc}$ may be used, but it will be appreciated that, in some embodiments, a common current reference signal may be provided to the current sources 810. As noted above, a buck current regulator 812 and a PWM control circuit 814 may be integrated in a module or similar assembly configured to be to be coupled to other similar modules to provide a scalable system for driving strings of LEDs. Such a module may receive an externally supplied current reference signal and/or may generate a current reference signal within the module.

Figure 9:
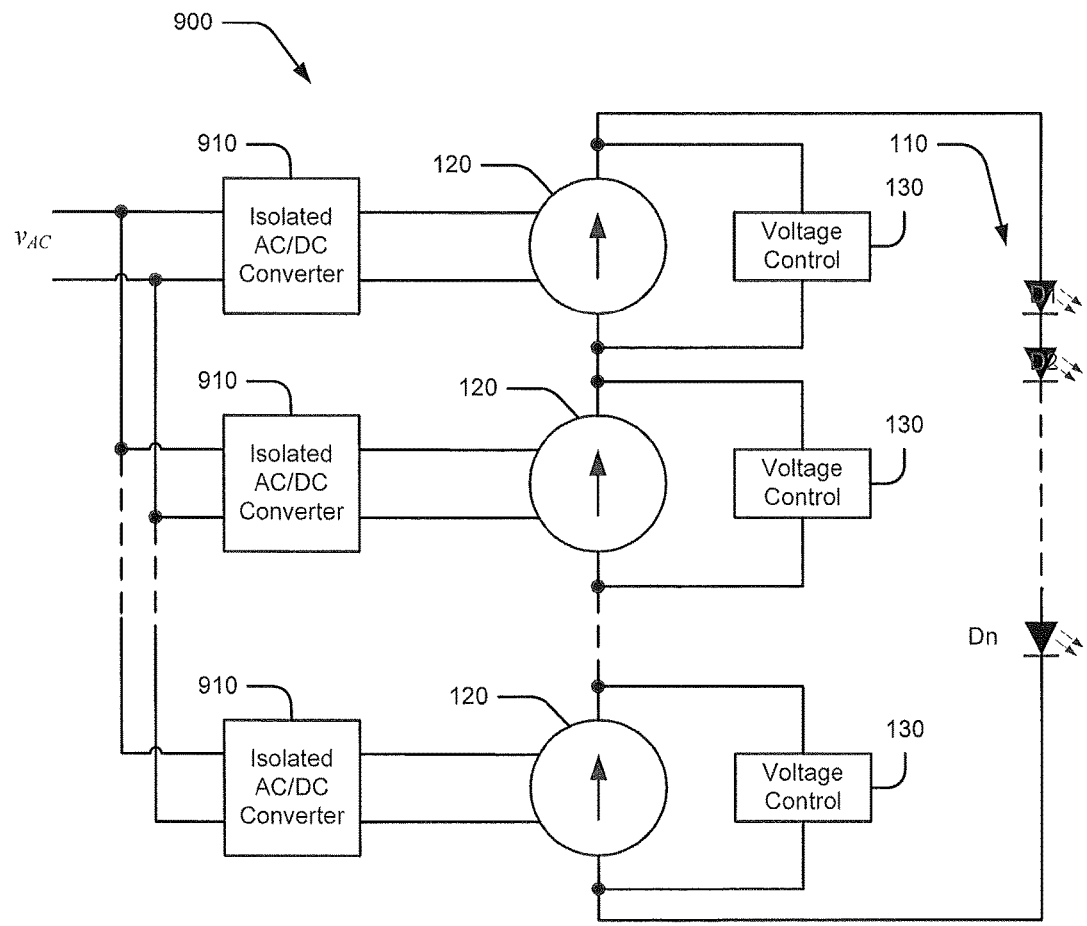
FIG. 9 is a schematic diagram illustrating lighting apparatus with series-connected current sources fed by parallel-connected isolated AC/DC converters according to some embodiments.
Figure 10:
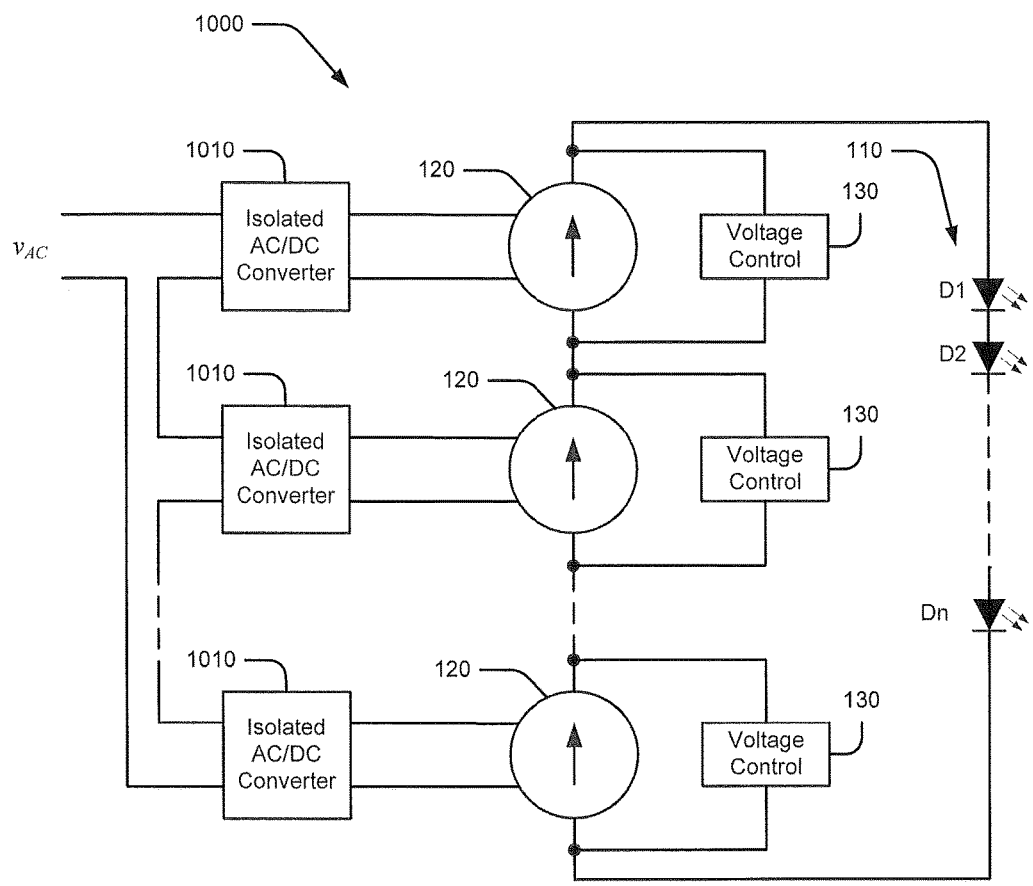
FIG. 10 is a schematic diagram illustrating lighting apparatus with series-connected current sources fed by series-connected isolated AC/DC converters according to some embodiments.
Figure 11:
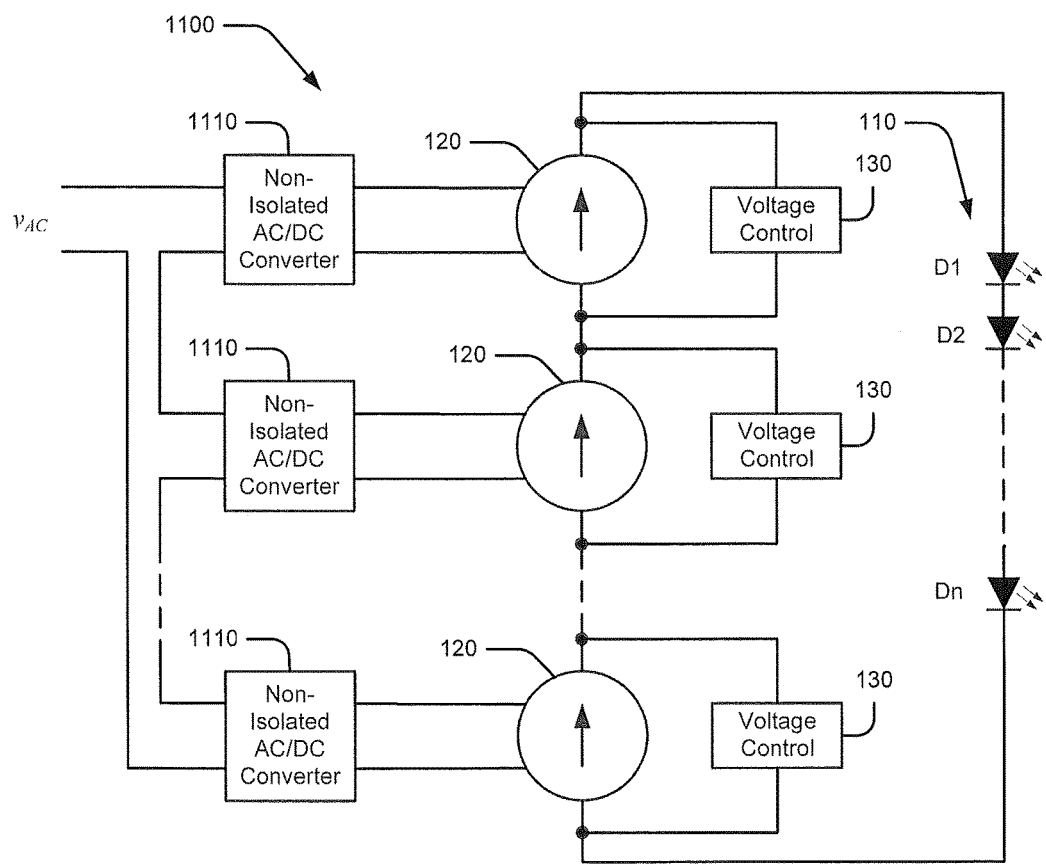
FIG. 11 is a schematic diagram illustrating lighting apparatus with series-connected current sources fed by series-connected non-isolated AC/DC converters according to some embodiments.
Figure 12:
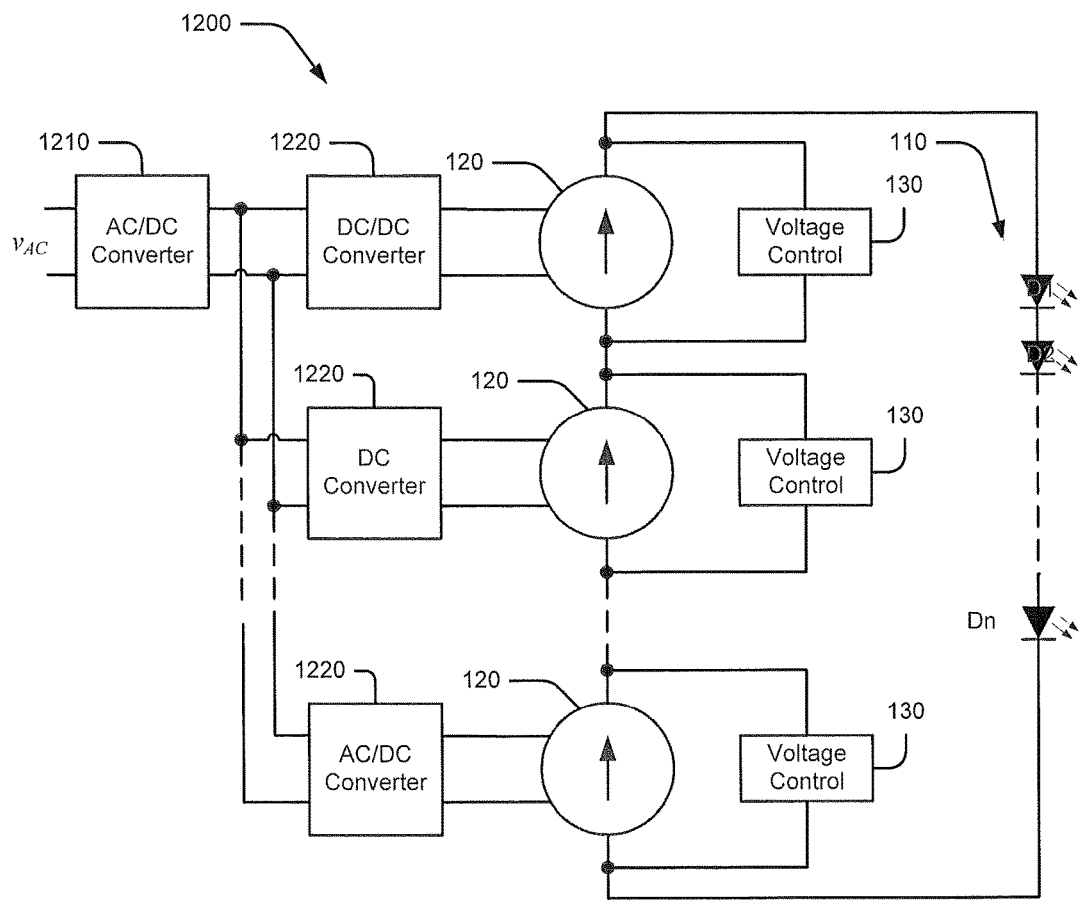
FIG. 12 is a schematic diagram illustrating lighting apparatus with series-connected current sources fed by parallel-connected DC/DC converters according to some embodiments.
Figure 13:
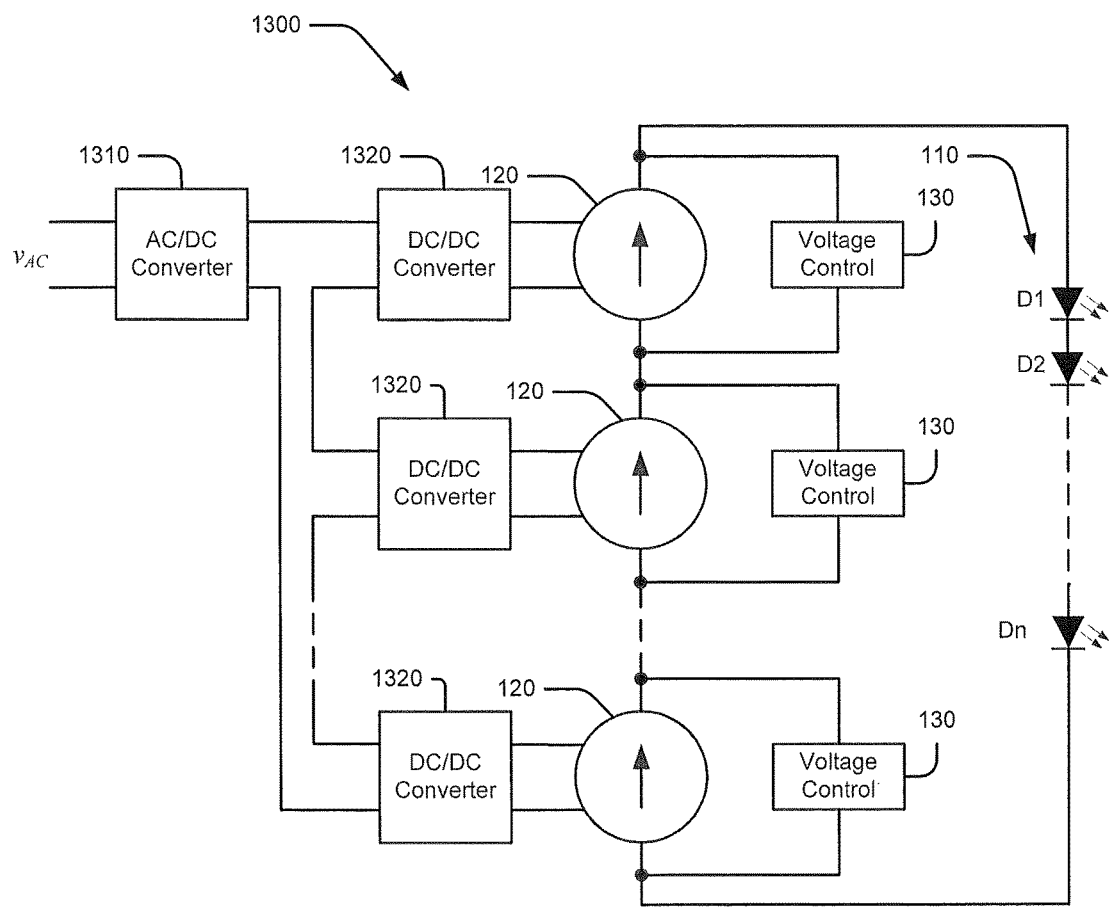
FIG. 13 is a schematic diagram illustrating lighting apparatus with series-connected current sources fed by series-connected DC/DC converters according to some embodiments.

According to various embodiments, power supplies may be coupled to series-connected current sources in many different ways. For example, FIG. 9 illustrates lighting apparatus 900 in which series-connected current sources 120 with voltage control circuits 130 as shown in FIG. 1 are fed by parallel-connected isolated AC/DC converter circuits 910. The AC/DC converter circuits 910 may be coupled to an AC source, such as a branch circuit of an AC power distribution system. FIG. 10 shows lighting apparatus 1000 with a different arrangement in which the current sources 120 are fed by series-connected isolated AC/DC converter circuits 1010. FIG. 11 shows lighting apparatus 1100 in which the current sources 120 are fed by series-connected non-isolated AC/DC converter circuits 1110. FIG. 12 shows lighting apparatus 1200 in which current sources 120 are fed by parallel-connected DC/DC converter circuits 1220 that receive power from a common AC/DC converter circuit (e.g., rectifier) 1210. FIG. 13 shows lighting apparatus 1300 in which current sources 120 are fed by series-connected DC/DC converter circuits 1320 that receive power from a common AC/DC converter circuit (e.g., rectifier) 1310. The AC/DC converter circuits 1210, 1310 and/or the DC/DC converter circuits 1220, 1320 may provide isolation. It will be appreciated that the converter circuits shown in FIGS. 9-13 may be implemented in any of a number of different ways. It will be further appreciated that power may be provided to series-connected current sources in other ways in apparatus that is not AC powered, e.g., using various DC/DC converter arrangements.

Embodiments of the inventive subject matter may be illustrated and described herein in any of a number of patentable classes or contexts including any new and useful process, machine, manufacture, or composition of matter, or any new and useful improvement thereof. Accordingly, some embodiments of the inventive subject matter may be implemented in hardware or as combinations of software and hardware that may all generally be referred to herein as a "circuit," "circuitry," "module," "component," and/or "system." Furthermore, some embodiments of the inventive subject matter may take the form of a computer program product comprising one or more computer readable media having computer readable program code embodied thereon. It will be appreciated that such computer code may be stored in a computer readable storage medium integrated within a computing device, such as a microprocessor or microprocessor, within a memory device coupled to such a computing device, and/or in a computer accessible location, such as a website. Generally, computer readable media may include, but is not limited to, electronic, magnetic, optical, electromagnetic, or semiconductor system, apparatus, or device, or any suitable combination of the foregoing.

Embodiments of the inventive subject matter are described herein with reference to block diagrams and other types of illustrations depicting methods, apparatus, and computer program products. It will be understood that various blocks of block diagrams, and combinations of blocks in block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the disclosure.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so. As used herein, the term "and/or" or "/" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. When a third element "couples" first and second elements, additional intervening elements may be present between the third element and the respective first and second elements. It will be further understood that elements "coupled in series" or "serially connected" may be directly coupled or may be coupled via intervening elements.

The expression "lighting apparatus", as used herein, is not limited, except that it indicates that the device is capable of emitting light. For example, lighting apparatus can include, but is not limited to, devices that illuminate areas or volumes (e.g., structures, vehicles, signage, vessels, electronic devices, aircraft, landscape elements, topographic and geological features, etc.), bulbs and bulb replacements, outdoor and security lights, residential lights, commercial lights, industrial lights, task lights, specialty lights and any other light emitting devices or systems.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The corresponding structures, materials, acts, and equivalents of any means or step plus function elements in the claims below are intended to include any disclosed structure, material, or act for performing the function in combination with other claimed elements as specifically claimed. The description of various embodiments of the inventive subject matter herein has been presented for purposes of illustration and description, but is not intended to be exhaustive or limited to the forms disclosed. Many modifications and variations will be apparent to those of ordinary skill in the art without departing from the scope and spirit of the disclosure.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. An apparatus comprising:
   a plurality of series-connected current control circuits configured to control a current therethrough responsive to at least one current reference signal and to be coupled in parallel with a load; and
   a voltage control circuit configured to control respective voltages across respective ones of the current control circuits.

2. The apparatus of claim 1, wherein the voltage control circuit is configured to individually adjust responses of the current control circuits responsive to the voltages across the current control circuits.

3. The apparatus of claim 2, wherein the current control circuits comprise respective current control loops and wherein the voltage control circuit comprises a current reference adjustment circuit configured to generate adjusted current reference signals for the current control loops from the at least one current reference signal responsive to the voltages.

4. The apparatus of claim 3, wherein the current reference adjustment circuit is configured to nonlinearly map the voltages to the adjusted current reference signals.

5. The apparatus of claim 1, wherein the voltage control circuit comprises respective voltage limiters coupled across respective ones of the current control circuits.

6. The apparatus of claim 5, wherein the voltage limiters comprise respective diodes coupled across respective ones of the current control circuits.

7. The apparatus of claim 1, wherein at least one the current control circuits comprises:
   a buck current regulator circuit; and
   a pulse width modulation (PWM) control circuit configured to pulse-width modulate a switch of the buck current regulator circuit responsive to a current reference signal and a voltage across an output of the buck current regulator.

8. The apparatus of claim 7:
   wherein the buck current regulator circuit comprises:
      a freewheeling diode having a first terminal coupled to a first power supply node;

a switching transistor having a first terminal coupled to a second terminal of the freewheeling diode and a second terminal coupled to a second power supply node; and a capacitor having a first terminal coupled to the first power supply node; and an inductor having a first terminal coupled to a second terminal of the capacitor and a second terminal coupled to the first terminal of the transistor; and wherein the PWM control circuit is configured to drive a third terminal of the switching transistor responsive to a voltage across the capacitor and a current through the switching transistor.

9. The apparatus of claim 8, wherein the at least one of the current control circuits further comprises a current sense resistor coupled in series with the switching transistor and wherein the PWM control circuit is configured to drive the third terminal of the switching transistor responsive to a voltage across the current sense resistor.

10. The apparatus of claim 1, further comprising at least one light emitting device coupled in parallel with the plurality of series-connected current control circuits.

11. The apparatus of claim 10, wherein the at least one light emitting device comprises at least one LED.

12. The apparatus of claim 11, wherein the at least one LED comprises a string of LEDs.

13. A lighting apparatus comprising:

a plurality of current source circuits coupled in series and configured to receive at least one current reference signal and respective individual current reference adjustment signals, each of the current source circuits further configured to control current passing therethrough responsive to the at least one current reference signal and the current reference adjustment signal associated therewith;

a current reference adjustment circuit configured to generate the current reference adjustment signals responsive to voltages across respective ones of the current source circuits; and at least one light emitting device coupled in parallel with the plurality of current source circuits.

14. The apparatus of claim 13, wherein the current source circuits comprise respective current control loops and wherein the current source circuits are configured to generate adjusted reference signals for the current control loops responsive to the at least one current reference signal and the current reference adjustment signals.

15. The apparatus of claim 13, wherein relationships of the adjusted reference signals to the voltages across the current source circuits are nonlinear.

16. The apparatus of claim 13, wherein the current reference adjustment circuit acts to limit the voltages across the current source circuits.

17. The apparatus of claim 13, wherein the at least one light emitting device comprises at least one LED.

18. The apparatus of claim 17, wherein the at least one LED comprises a string of LEDs.

19. A method of operating a lighting apparatus, the method comprising:

coupling a plurality of series-connected current sources in parallel with at least one light emitting device; and limiting respective voltages across the current sources by modifying current references of the current sources responsive to the voltages.

20. The method of claim 19, wherein modifying the current references comprises nonlinearly mapping the voltages to the current references.

21. The method of claim 19, wherein limiting the respective voltages comprises limiting the voltages using respective clamping circuits coupled across respective ones of the current sources.

22. The method of claim 19, wherein the at least one lighting device comprises at least one LED.

23. The method of claim 22, wherein the at least one LED comprises a string of LEDs.

* * * * *

UNITED STATES PATENT AND TRADEMARK OFFICE
CERTIFICATE OF CORRECTION

| | |
|---|---|
| PATENT NO. | : 9,648,687 B2 |
| APPLICATION NO. | : 14/465580 |
| DATED | : May 9, 2017 |
| INVENTOR(S) | : Daniel Pope and Mike Walters |

It is certified that error appears in the above-identified patent and that said Letters Patent is hereby corrected as shown below:

In the Specification

In Column 3, Line 41, delete "LED's", and insert -- LEDs --, therefor.

In Column 3, Line 42, delete "D1, D2,..., D3", and insert -- D1, D2,..., Dn --, therefor.

In Column 5, Line 49, delete "Dc", and insert -- $D_c$ --, therefor.

In Column 5, Line 55, delete "$V_1+/V_1^-, V_2^+/V_2^-, V_3^+/V_3^-$", and insert -- $V_1^+/V_1^-, V_2^+/V_2^-, V_3^+/V_3^-$ --, therefor.

In Column 6, Line 3, delete "to be coupled", and insert -- coupled --, therefor.

In Column 6, Line 17, delete "$i_{refa}$, irefb, $i_{refc}$", and insert -- $i_{refa}$, $i_{refb}$, $i_{refc}$ --, therefor.

In Column 6, Line 22, delete "to be to be", and insert -- to be --, therefor.

In Column 7, Lines 3-4, delete "such as a microprocessor or microprocessor", and insert -- such as a microprocessor or microcontroller --, therefor.

In the Claims

In Column 8, Line 56, delete "at least one", and insert -- at least one of --, therefor.

In Column 9, Line 4, delete "node; and", and insert -- node; --, therefor.

Signed and Sealed this
Fifth Day of June, 2018

Andrei Iancu
*Director of the United States Patent and Trademark Office*